C. R. DODGE.
LAUNDRY MARKING MACHINE.
APPLICATION FILED JUNE 29, 1911.

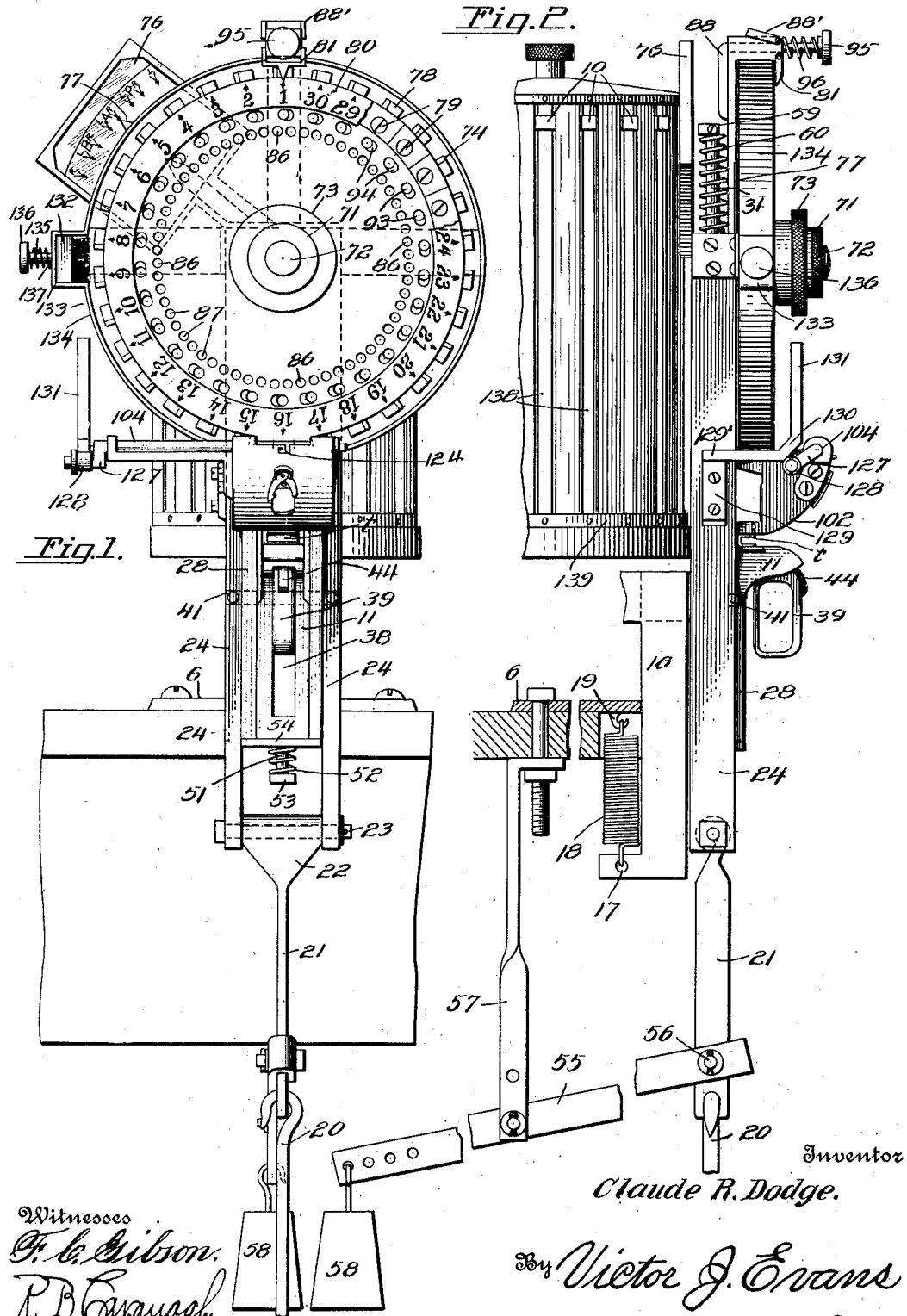

1,047,005.

Patented Dec. 10, 1912.
6 SHEETS—SHEET 2.

Witnesses
F. C. Gibson.
R. B. Cavanagh.

Inventor
Claude R. Dodge
By Victor J. Evans
Attorney

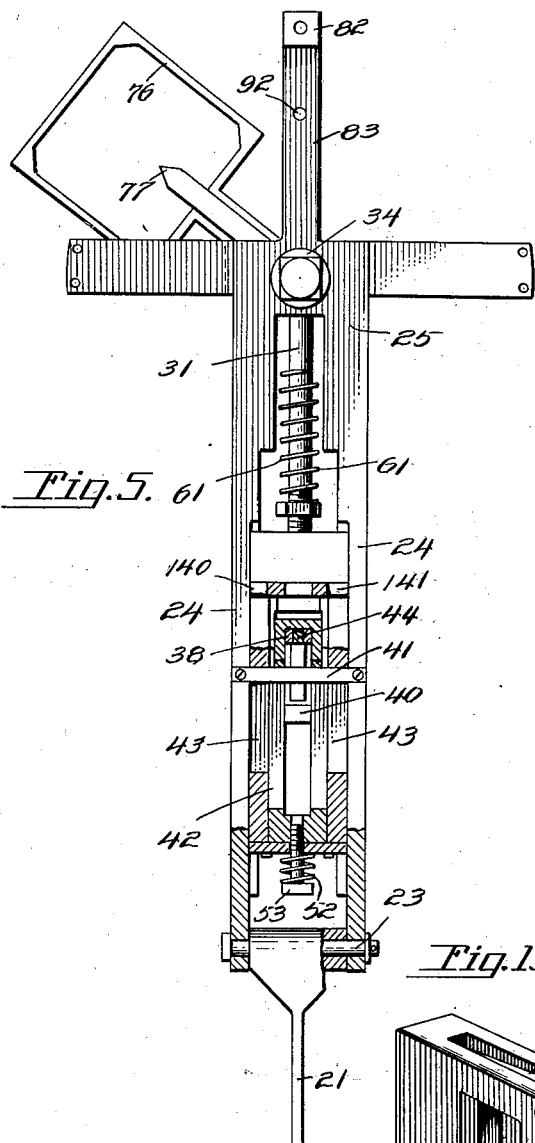
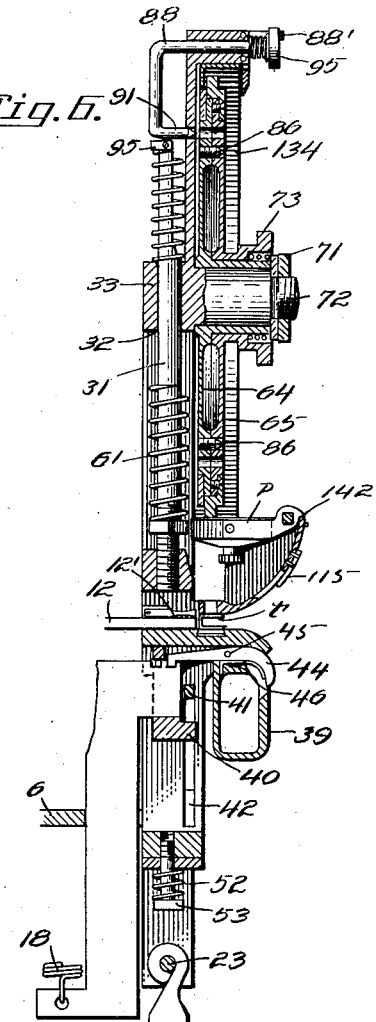
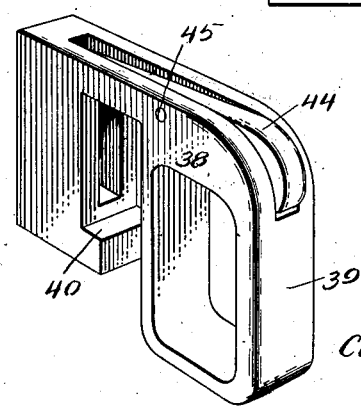

C. R. DODGE.
LAUNDRY MARKING MACHINE.
APPLICATION FILED JUNE 29, 1911.
1,047,005.
Patented Dec. 10, 1912.
6 SHEETS—SHEET 4.
Fig. 7.
Fig. 8.
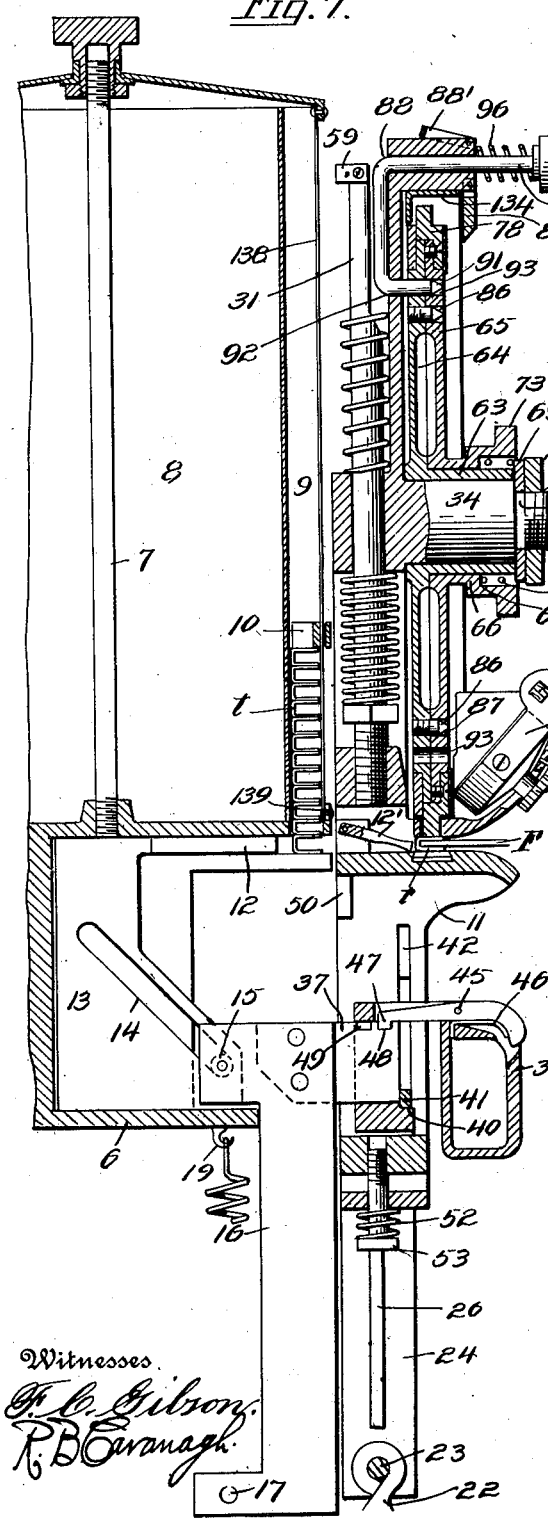
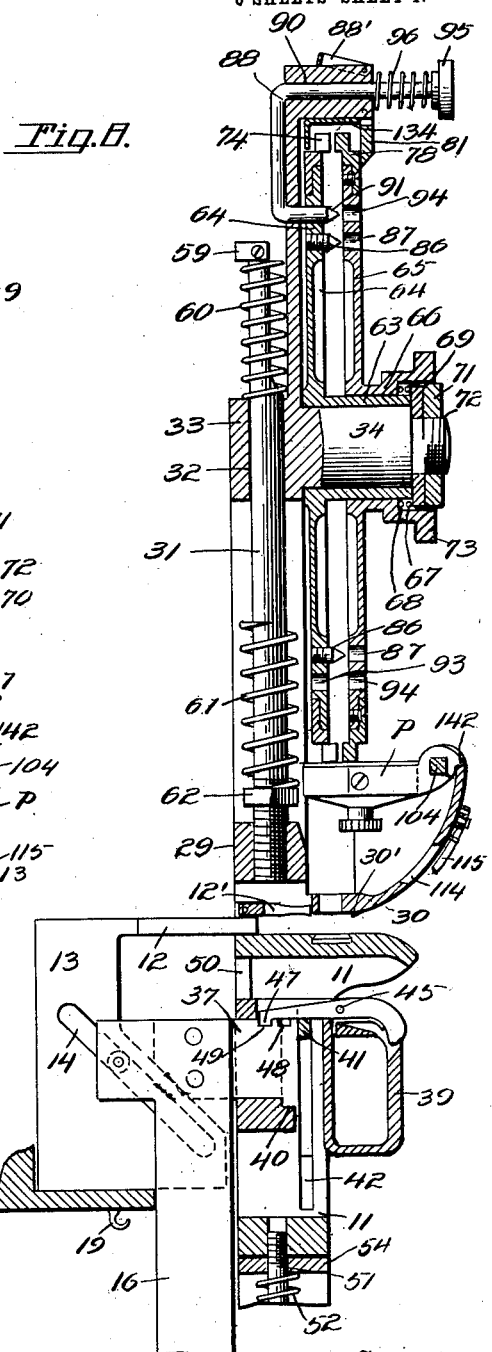
Witnesses
F. C. Gibson.
R. B. Cavanagh.
Inventor
Claude R. Dodge.
By Victor J. Evans
Attorney

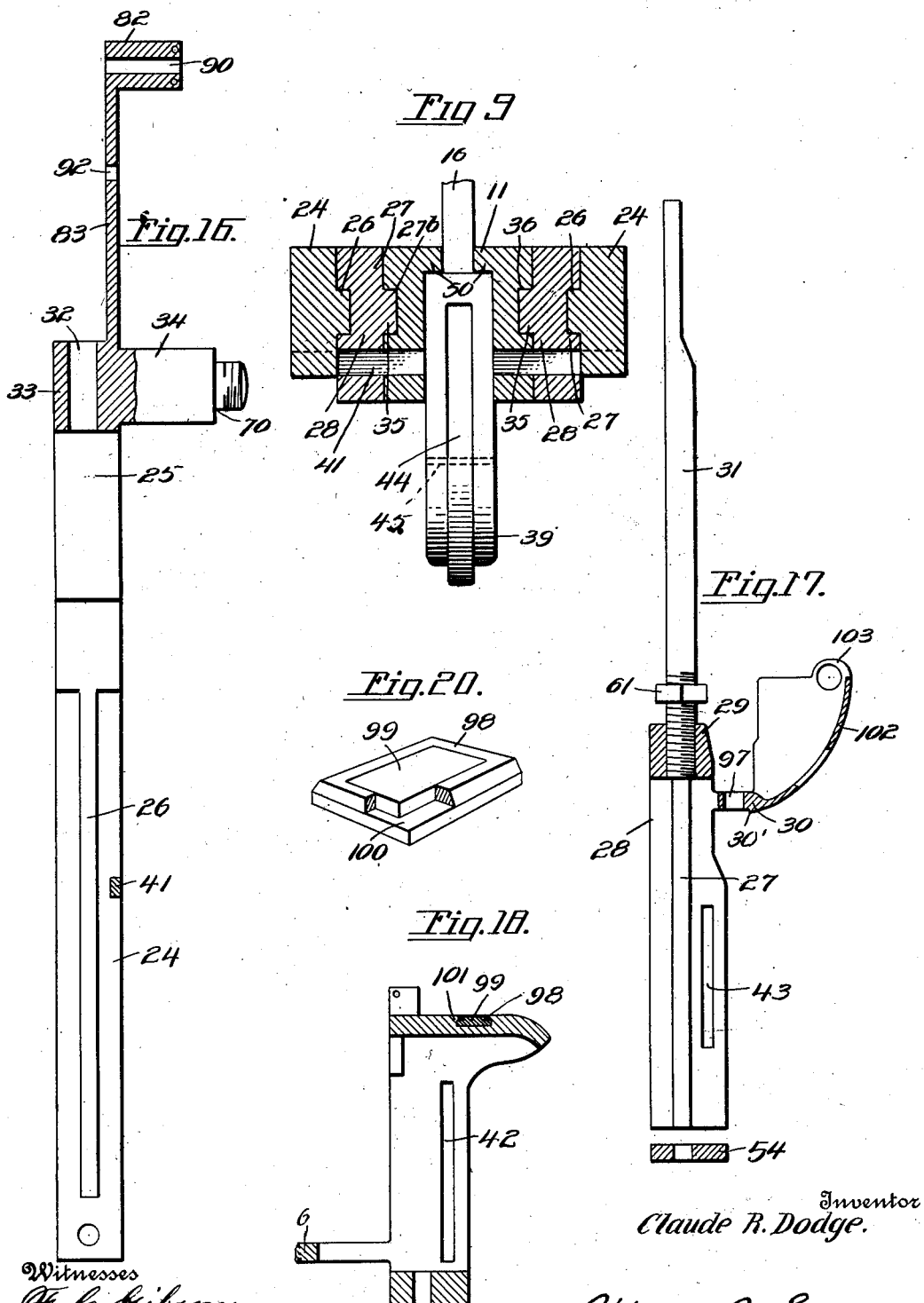

C. R. DODGE.
LAUNDRY MARKING MACHINE.
APPLICATION FILED JUNE 29, 1911.
1,047,005.
Patented Dec. 10, 1912.
6 SHEETS—SHEET 6.
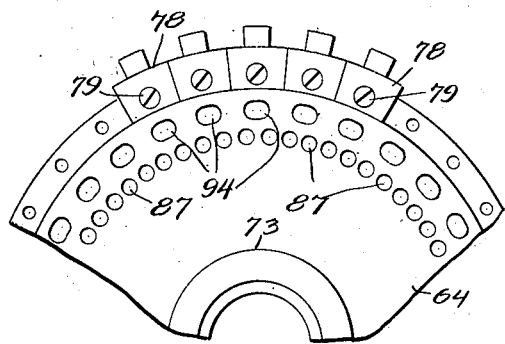
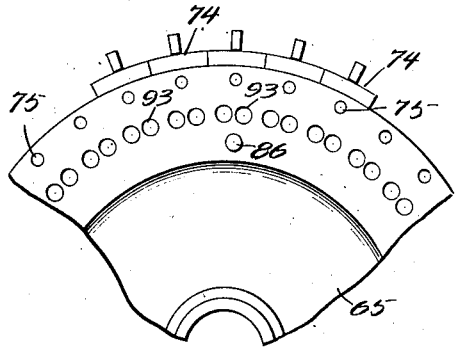
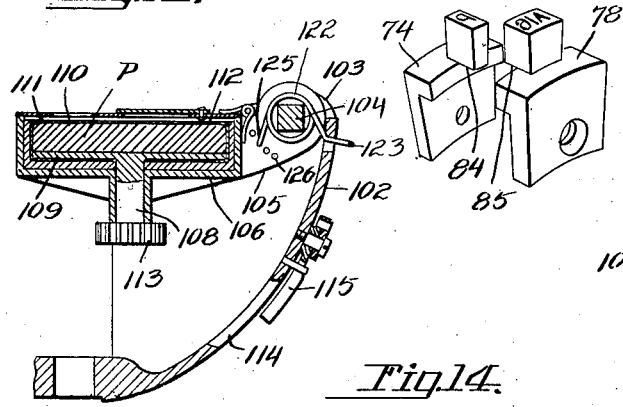
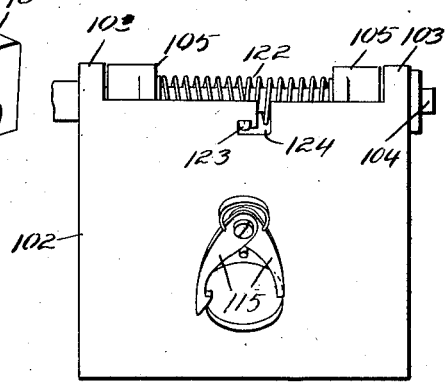
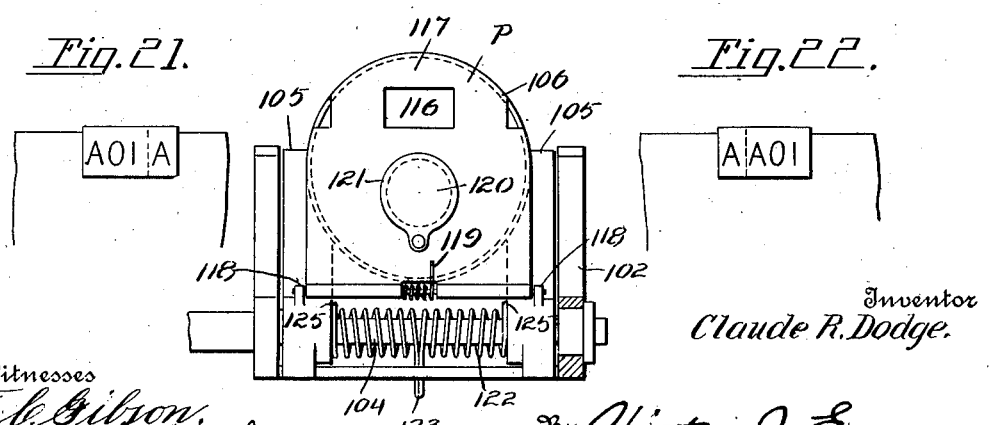

UNITED STATES PATENT OFFICE.

CLAUDE R. DODGE, OF RENO, NEVADA.

LAUNDRY-MARKING MACHINE.

1,047,005. Specification of Letters Patent. Patented Dec. 10, 1912.

Application filed June 29, 1911. Serial No. 635,932.

*To all whom it may concern:*

Be it known that I, CLAUDE R. DODGE, a citizen of the United States, residing at Reno, in the county of Washoe and State of Nevada, have invented new and useful Improvements in Laundry-Marking Machines, of which the following is a specification.

The present invention relates to certain novel and useful improvements in laundry marking machines.

In carrying out my invention, it is my purpose to provide an automatic machine whereby laundry tags may be continuously fed and affixed to the articles to be laundried, and, furthermore, my machine is adapted to print or mark the tags with identifying characters, simultaneously with the attachment of such tags to the articles.

It is also my purpose to provide a machine which may be employed as a printing or marking mechanism, to apply identifying characters to the body of the article, itself, thereby dispensing with the use of the tag, the feeding and affixing mechanism for the latter being thrown out of operation under such condition of use of the machine.

A further object of my invention is to provide an automatic machine of the class described which will embody the desired features of simplicity, durability and efficiency, and by means of which the tags may be applied and the articles marked, rapidly, conveniently and systematically.

With the above-recited objects, and others of a similar nature in view, the invention consists in the construction, combination and arrangement of parts, set forth in and falling within the scope of the appended claims.

Figure 3:
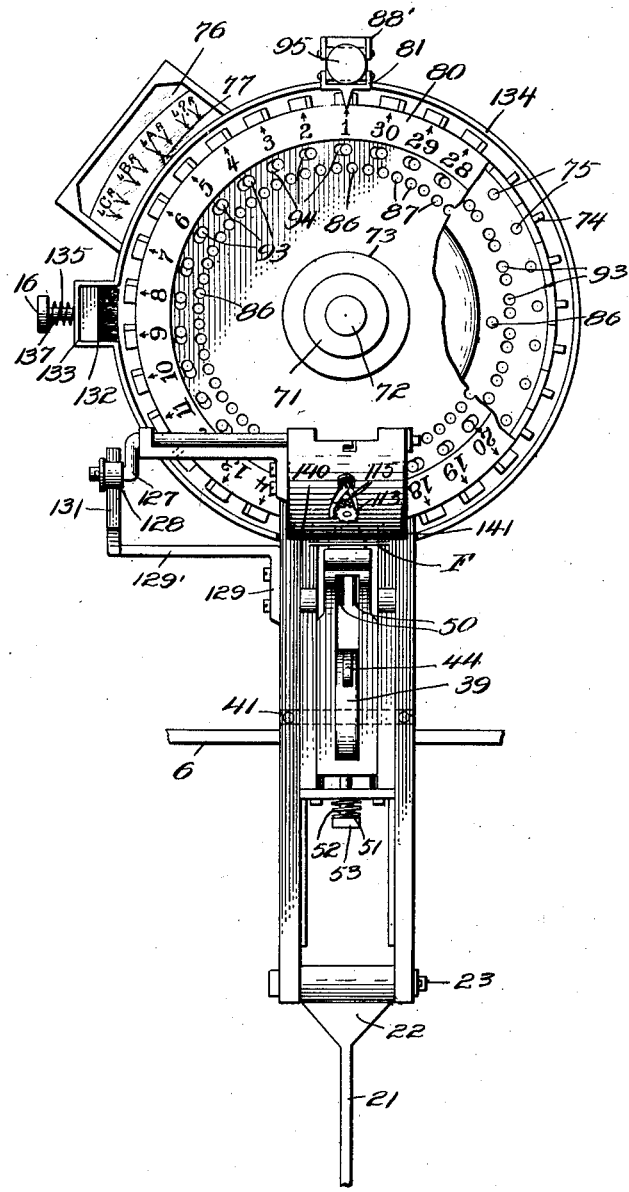
Figure 4:
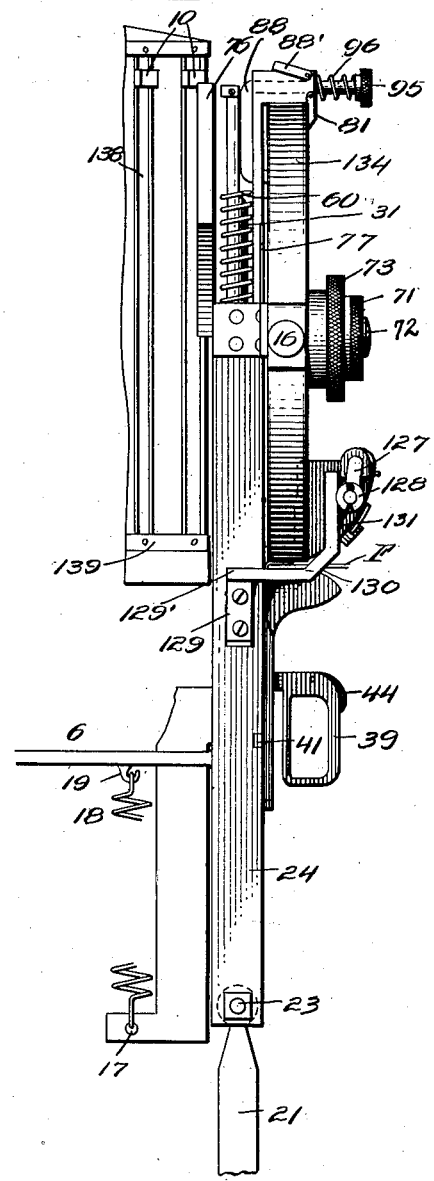

In the accompanying drawings:—Figure 1 is a view in front elevation of a machine embodying my invention. Fig. 2 is a view in side elevation of the same with a portion of the tag-containing hopper broken away. Fig. 3 is another view in front elevation, showing the printing and tag-affixing mechanism of the machine in lowered, operating position, a portion of the front dial of the machine being broken away. Fig. 4 is a side view in elevation, showing the machine in clamping and printing position, as shown in Fig. 3. Fig. 5 is a view partly in elevation and partly in vertical section of the frame of the marking dials and tag-affixing or clamping mechanism. Fig. 6 is a vertical longitudinal sectional view through the marking dials and tag-affixing mechanism, showing the machine in position to rotate the two interlocking marking dials to bring the back dial into its proper position for a selected character. Fig. 7 is a vertical longitudinal sectional view through the machine, showing the latter in tag-affixing and printing position. Fig. 8 is a similar view, with the tag hopper omitted and the tag feeding and affixing mechanism held out of operation, the front printing dial being shown as disengaged from the rear dial, the latter being in a position to be rotated into its proper position for a selected numeral. Fig. 9 is a cross sectional view taken on the line 9—9 of Fig. 1. Fig. 10 is a face view of a section of the front printing dial. Fig. 11 is a similar view of the rear printing dial. Fig. 12 is a vertical sectional view taken through the inking mechanism of the machine. Fig. 13 is a view in elevation of the housing or hood of the inking mechanism. Fig. 14 is a top plan view of the inking mechanism. Fig. 15 is a detail perspective view, showing a portion of each of the type-carrying disks, with type for the same. Fig. 16 is a vertical sectional view, through the movable plunger frame for carrying the printing disks. Fig. 17 is a view partly in elevation and partly in section of the movable post upon the clamping jaw and upon which the plunger frame slides, the housing of the inking mechanism being shown as carried by the post. Fig. 18 is a vertical sectional view taken through the anvil of the machine between which and the clamping jaw the clamping of the tag or goods takes place. Fig. 19 is a detail perspective view of the device for holding the tag feeding mechanism in or out of operation. Fig. 20 is a detail perspective view, partly in section, of the pad carried by the anvil. Fig. 21 is a detail view, showing one manner in which the marking characters may be combined and applied to the article. Fig. 22 is another combination of the characters.

In the patent granted to Akerly and Borchert, No. 878,593, dated February 11, 1908, for a machine for feeding and affixing laundry tags, there is shown mechanism for distributing U-shaped laundry tags and affixing the same to the articles to be laundried, and my invention is in the nature of an improvement upon the machine of such patent.

In marking an article of laundry, it is desirable that the identifying characters should be such as to indicate to one acquainted with the same, three distinct facts; first, the laundry to which the goods are charged; second, the agent or solicitor having the particular route upon which the goods are collected; and, third, the customer to whom the article of laundry belongs. To accomplish such three-fold identification, I employ a printing or marking mechanism, which, in the present instance embodies two type-carrying wheels or disks. The first of these disks, for instance, the front disk is provided with a series of thirty consecutive numbers running, for example, from 01 to 30, inclusive, and directly in front or to the left of each of these numbers appears a distinctive letter, as the letter A which always indicates the particular laundry to which the goods are chargeable. The second or back disk is provided with a series of characters or letters which I term "combination" characters and in the present instance there are thirty of these "combination" characters, composed, for example, of the twenty-six letters of the alphabet and for other arbitrary marks to make up the thirty characters. To give a concrete example of marking, I may assume that the Alpha laundry receives through its agent or collector, Mr. White, an article which is the property of a customer, Mr. Gray, upon White's route. Taking the mark shown in Fig. 21, which is A01A, the designating portion of this mark for the Alpha laundry is the letter A appearing directly to the left of the numeral. If the numerals from 01 to 15, or fifteen of the thirty numbers on the front disk, together with the "combination" characters on the back disk are assigned to the agent White for his customers, this agent's number 01, in conjunction with the letter A to the right of the number will constitute a mark for his customer Gray. Therefore, in the mark A01A the first A or that to the left indicates the Alpha laundry, the 01 shows that the article belongs upon the route of the agent White, and the 01A shows that the customer upon White's route is Gray, or the entire mark A01A is Gray's laundry mark.

The two disks are rotatable relative to each other so that a "combination" character may be placed either at the right or left of the distinctive laundry indicating letter and the figures on the front wheel, so that with thirty numbers upon the front wheel and thirty "combination" characters on the rear or back wheel eighteen hundred different marks for the customers may be made with the machine by moving the "combination" characters to the right or left of the thirty characters on the front wheels. In the example given, the numbers 1 to 15, or fifteen numbers were assigned to the agent White. He may, by using these fifteen numbers in combination with the thirty "combination" characters on the back disk make nine hundred distinctive customer marks, as by turning the back disk so that the thirty "combination" letters appear at the right of the fifteen numbers, he obtains four hundred and fifty marks and by turning the back disk so that his thirty "combination" letters appear at the left of the fifteen numbers he gets four hundred and fifty additional marks.

My improved method and mechanism for printing or marking may be employed in this machine to mark such articles as it is not desirable to tag, such as collars, handkerchiefs and the like, and it may also be used in conjunction with the mechanism for distributing and clenching tags to the articles, the tag or tags being simultaneously marked or stamped, and clamped or affixed to the article.

Referring now to the accompanying drawings in detail, and particularly to Figs. 1 to 4, the letter X indicates a suitable table or support upon which is mounted the base frame Y of the machine, the latter comprising a top and bottom plate 5 and 6, respectively. Mounted upon the base frame is a supporting standard 7, carrying the rotatable tag-containing reservoir 8, the latter being preferably cylindrical in form and having arranged radially at the periphery thereof, vertically extending U-shaped pockets 9 for the reception of the tags $t$, the latter being of U-shaped form. Each of the vertical tag-containing pockets is provided with a small weight 10 which rests upon the top of the row of tags and feeds down with the same, said weights assisting in holding the tags in position for feeding.

Carried by the base frame is the stationary jaw or anvil 11. Adapted to reciprocate in a slot 5′ and the top plate 5 is a sliding push bar 12 formed integral with the vertically extending web 13 which slides between the plates 5 and 6 of the base frame, said vertical web 13 having a diagonal elongated slot 14 formed therein through which projects the cross roller 15 carried by the upper end of the vertical arm 16 which projects through the base plate 6 and has at its lower end an angular extension 17 to which is fastened one end of the contraction spring 18, the opposite end of said spring being connected to a hook or the like 19 carried by the under side of the base plate 6, so that said arm 16 is normally pulled upward by the spring thereby throwing the tag feeding push bar 12 forward, as shown in Fig. 6, to deliver one of the tags to the anvil and in position to be clamped on the article to be laundried and marked by the printing mechanism. The push bar is retained by depressing the machine operating the foot lever 20 connected to the link arm 21, the latter having a widened rolled end 130

22, through which passes the pivot bolt 23 which connects the arm of the side members 24 of the bifurcated or forked plunger 25 which reciprocates vertically. The side members 24 are formed on their inner faces with the vertically extending tongues 26 lying in corresponding grooves 27 formed longitudinally of the outer faces of the arms 28 of the bifurcated portion of the plunger post 29 carrying the clamping jaw 30. The plunger frame 25 slides upon and is guided in its travel by the plunger post 29, the latter having a vertical guide standard or rod 31 which projects through the vertical bore 32 in the sleeve 33 from which latter projects the axle 34 for the purpose hereinafter described.

The plunger post arms 28 in turn are provided with longitudinally extending tongues 35 fitted and sliding in corresponding grooves 36, formed in the sides of the anvil 11. (See Fig. 9.) From this it will be seen that the plunger post carrying the tag clamping jaw slides vertically relative to the anvil and the plunger frame likewise moves vertically guided by the plunger post.

The vertical arm 16 is provided with the laterally extending head 37 which reciprocates vertically in the elongated slot or openings 38 cut vertically in the body of the anvil. Adjustably mounted on the head 37 is the member 38 for placing the tag-feeding mechanism in and out of operation. This member which is shown in detail in Fig. 19 is in the form of a block having a handle portion 39 by which it may be shifted laterally on the head 37, as hereinafter described. This block is provided with an inwardly extending shoulder 40 which, when the tag-feeding mechanism is in operative position, projects laterally into the path of movement of the cross bar 41 which extends through vertical slots 42 in the anvil body, alining slots 43 in the arms 28 of the plunger post 29 and is secured at its ends to the members 24 of the plunger frame 25 to which the foot lever is connected, (see Fig. 5.) When the foot lever is depressed the plunger frame 25 is drawn downward carrying the cross bar 41 which moves in the slots in the anvil and plunger post 29 until it strikes the shoulder 40 of the block 38 which being connected with the arm 16 pulls the latter down with it causing the roller 15 to ride in the diagonal slot 14 thereby forcing the tag pusher bar 12 backward against the action of the spring 18 and to a position to feed a tag to the anvil. Upon the release of the pressure upon the foot lever, the spring 18 draws the arm 16 upward thereby forcing the tag pusher bar forward carrying the tag to the anvil. As the pusher bar is again retracted and leaves the tag on the anvil, the pivoted stop 12′ drops down behind such tag and holds the same against backward movement and in position to be clamped. The face of the clamping jaw is shouldered slightly as shown at 30′ to form a stop for preventing the forward movement of the tag while clamping.

In order to entirely disconnect the tag-feeding device from the foot lever mechanism and thereby throw the tag-feeding device out of operation, I provide the laterally adjustable block member 38 with a locking dog 44 pivoted at 45 and provided with the leaf spring 46 bearing against the end of the dog thereby throwing the head 47 of the latter into locking lug with one or the other of the notches 48—49 in the upper edge of the bead 37 of the arm 16. When the tag-affixing mechanism is to be connected in operative relation with the foot lever, the dog is depressed by the thumb of the operator to lift the head 47 and the block is pulled outward and the dog then released to permit the head to drop into the notch 48, so that the shoulder 40 lies in the path of the descending cross bar 41. To disconnect the tag-feeding device, the foot lever should be depressed a sufficient distance to withdraw the pusher bar 12 back from the path of the clamping jaw and the head 47 of the dog is then lifted from the notch 48, and the block pushed inward so that it passes beneath the two shoulders 50 at the inner side of the slot 38 of the anvil and the head 47 of the dog engages with the notch 49 when the shoulder 40 of the block will be held out of the path of the descending cross bar 41. With the parts in this position, the spring 18 is partly expanded and were it not for the shoulder 50 the pusher bar 12 would be thrown by the spring into the path of the movable clamping jaw. However, as will be seen in Fig. 8, the end of the block bears against these shoulders 50, against the tension of the spring and holds the pusher bar out of the path of the moving clamping jaw.

As has been heretofore mentioned, and as will be seen by referring to Fig. 17, the clamping jaw 30 which coöperates with the anvil to clamp the tags is carried by the plunger post 29 and is normally held a sufficient distance above the anvil to permit the reception of a tag conveyed from the reservoir by the tag pusher bar. To accomplish this, I provide an adjustable bolt or stud 51 which is threaded into the base of the body of the anvil and carries the expansion spring 52, one end of which bears against the bolt head 53 while the opposite end bears against the cross bar 54 extending under and attached to the ends of the arms 28. This spring, therefore, normally thrusts upward against the bottom of the plunger post and holds the clamping jaw 30 above the anvil as described. The tag is now ready to be clamped and this operation is accomplished as follows:—As has been shown, the plunger frame 25 to which the foot lever is attached moves or slides on the plunger post, the standard 31 of the post passing through the sleeve 33 of the frame so that the plunger frame is held elevated on the standard by the lever 55 connected at 56 to the arm 21, said lever being fulcrumed to the suspender bar 57 attached to the under side of the table, while 58 is a counter-weight suspended at the free end of the lever and adjustable along the same. Loosely surrounding the upper portion of the standard 31 between the top of the sleeve 33 and the adjustable collar 59 is the coiled spring 60 which, when the frame moves downward on the post, drops with the same, and when the frame rises it is lifted and contacts with the collar 59, the spring thereby forming a cushion or buffer which limits the upward movement of the frame.

The numeral 61 designates a coil spring surrounding the lower portion of the standard 31, the lower end of the spring bearing against the adjustable nut 62, the upper end of the spring terminating some distance below the lower end of the sleeve 33 when the plunger frame is elevated and for the purpose hereinafter set forth. It will be seen that as the foot lever is depressed against the action of the counterweight 58, the sleeve 33 of the plunger frame moves downward on the standard 31 of the plunger post until it contacts with the top of the spring 61. The continued downward movement of the sleeve compresses the spring 61 which being stronger than the spring 52 holding up the plunger post to which the clamping jaw 31 is attached, overcomes the resistance of the spring 52 and forces the plunger post down causing the jaw 30 to clamp the tag against the anvil.

*Printing or marking mechanism.*—Having described the tag-feeding mechanism, the manner of placing the same into and out of operation, and the manner of clamping the tag, I will now describe the mechanism for printing the laundry mark upon the tag or goods. Rotatably mounted upon the axle 34 of the plunger frame 25 is a hub 63 carrying at its rear end a wheel or disk 64 which for convenience will be hereinafter termed the back disk, while sleeved to slide and rotate on the hub of the back disk is a second disk or wheel 65 hereinafter termed the front disk the sleeve 66 to receive the coil compression spring 67 one end of which bears against the shoulder 68, the opposite end abutting against the washer 69 fitting on the squared stud 70 projecting from the axle while 71 is a nut threaded on the end 72 of the stud to hold the parts in position. It will thus be seen that the spring 17 normally presses the front disk inward against the back disk, while the front disk may be separated from the back disk by pulling outward on the flange 73 of the sleeve against the action of the spring.

A back disk is provided around its periphery with a series of radially extending individual type 74 detachably connected to the disk by screws or rivets 75. In the present instance, I employ thirty of such type, each representing a "combination" character which I have heretofore mentioned. On the rear face of the back disk I mark thirty characters corresponding to the type on the disk and including on each side of each character so marked the letters L and R indicating "left" and "right" and also mark designating arrows or other indicia for each of these letters L and R. A mirror 76 is preferably arranged at the proper angle at or near the top of the disk so that when the latter is rotated to reflect a desired mark in the mirror and in line with the indicating pointer 77 carried by the plunger frame (as shown in Figs. 1 and 5), the individual type having this mark will be at the bottom of the disk in position for printing. In other words, the character marked on the back of the disk is not directly at the type itself which prints such a mark, but is positioned on the disk so that it shows in the mirror at the pointer when the type itself is in printing position. The "combination" characters marked on the back of the disk are, of course, reversed so that they show in proper position in the mirror. The front disk is also provided at its periphery with a series of radially extending type 78 also thirty in number, which are detachably connected to the disk by screws or other fastening means 79, and each type embodies a letter and a numeral, for instance, the letter A which is the distinctive mark of the laundry and always appears at the left of each and every numeral, and the numerals which run from 01 to 30, inclusive. The numerals are also marked on the front face of the disk, as shown at 80 in Figs. 1 and 3, the arrangement being such that when a selected number marked on the front face of the front disk is in line with the indicator point 81 carried by the angular head 82 of the arm 83 of the plunger frame, the corresponding type will be in position at the bottom of the disk for printing upon the tag or goods.

Referring to Figs. 8 and 15, of the drawings, it will be seen that the type on the back disk carrying the "combination" characters project forward from the periphery of the wheel as shown at 84 while the type on the periphery at the front wheel project rearward therefrom as at 85 so that when the type of the two wheels are locked in face-to-face contact for printing, the type thereof will lie in proper alinement and print the mark as shown in Figs. 21 and 22, the mark being printed on the tags or goods at right angles to the axis of the printing disks, and also held against rotation as shown in Fig. 7, and this is accomplished by the following means: Carried by and extending forwardly from the front face of the rear disk are the pins 86, in the present instance four in number, which, when the disks are face-to-face are designed to project through alining transverse apertures 87 in the front disk. It will be seen that there is a circular row of these apertures entirely around the front disk, so that the pins may project through any selected apertures of this row to lock the disks, whereby they may rotate together. To hold the interlocked wheels against rotation during the printing operation, I provide an angular U-shaped pin 88 having the long arm 89 thereof slidably mounted in the lateral bore 90 in the angular head 82 of the arm 83 of the plunger frame 25. The short pivoted arm 91 of the angular pin projects forwardly through the aperture 92 in the arm 83 and one of the circular holes 93 which is in alinement therewith. It will be observed that the circular holes 93 are arranged in pairs in a circular row in the back disk, while adapted to aline with each pair of holes 93 is an elongated aperture 94 in the front disk there being also a circular row of these apertures in the front disk. The arm 91 projects through the right or left of a pair of the holes 93 dependent upon whether the "combination" type of the disk is to be held to the right or left of the type on the front disk, and also projects through the alining elongated aperture 94. The apertures 94 are elongated to accommodate the arm 91 irrespective of whether the latter extends through the right or left of the alining pair of the holes 93. The long arm 89 of the U-shaped pin is provided with a head 95 and interposed between this head and the lateral head 82 is a spring 96 which normally tends to draw the pin into position to lock the disks against rotation.

To set the disks for printing, I proceed as follows:—Assuming it to be desired to print the mark A01A, shown in Fig. 21 and taken as an example, the foot lever is slightly depressed and the button or bead 95 of the U-shaped pin is pushed inward as shown in Fig. 6, thus permitting the two interlocked disks to rotate on the axle. They are now turned by the flange 73 until the "combination" letter "A" of the back disk shows in the mirror and the letter "R" indicating the right hand side is in line with the indicator pointer 77, as shown in Fig. 1, and the type corresponding is in printing position. The pin 88 is now released to again lock the disks against rotation. The operator now pulls outward on the flange 73 thus pulling the front disk away from and out of interlocking engagement with the rear disk, as shown in Fig. 8. The front disk is now rotated until the numeral 1, (which indicates or is the same as 01), appears at the pointer 81. The type bearing the characters A01, is now at the opposite side of the disk or at the bottom thereof, in printing position, and in line with the "combination" character "A" of the back disk. The pull on the front disk is now released and the spring 67 throws the disk back into face-to-face contact with the back disk, the pins 86 entering the alining holes 87 and locking the two disks together. The arm 91 of the pin 88 also projects into one of the alining elongated apertures 94, thus locking the disks against rotation. In case the operator through carelessness fails to set the front disk so the type aline in printing position, the end of the arm 91 of the pin 88 will strike the back of the front disk between two of the elongated apertures 94, thus the spring 67 acting on the front disk being stronger than the spring 96 acting on the U-shaped pin 88, forces the U-shaped pin back so that it will be directly over the top end of the standard 31. Should the operator now depress the foot lever to draw the frame and disk down to print the pin will strike the end of the standard 31 and prevent the descent of the printing parts, thus avoiding danger of defacing the type against the clamping jaw.

The clamping jaw 30 is provided with an opening 97 for the passage of the type in printing, and carried by the anvil is a small pad frame 98, while 99 is the pad or cushion of rubber or any suitable material having a flanged portion 100 upon which the frame rests, the sides of the frame being beveled to fit the correspondingly beveled walls 101 of a recess in the anvil and into which recess the frame and pad is slipped as is shown in Fig. 18. The pad and frame is assembled as is shown in Fig. 20. In addition to the opening 97 in the clamping jaw are two recesses 140 and 141 to accommodate the sets of type on each side of those used for printing, as shown by the dotted lines in Fig. 3, and cross section in Fig. 5.

Carried by and extending outward and upward from the clamping jaw 30 is a cup-shaped member 102, forming a hood or casing for the inking pad or casing as an entirety indicated by the letter P.

*The type inking mechanism.*—The operation of the inking mechanism is best shown in Figs. 1 to 4 and 7 and 8, and details of the mechanism appear in Figs. 12 to 14, inclusive. The hood has perforated ears 103 forming bearings for the rock shaft 104, carrying the arms 105 to which are connected the casing 106 of disk-like form having a tubular extension 107 at the bottom thereof forming a bearing for the rotatable stud 108 which projects into the casing and carries a base plate 109 of metal, upon which rests a pad or block 110 of absorbent material such as felt while 111 is a covering of fabric for the felt pad and 112 is a cup carrying the pad fabric, covering and base plate, said cup seating in the casing 106 and having an opening in the base of the passage for the stud 108. At the outer end of the stud is a ratchet nut 113 which, when the pad is in its outer non-inking position projects through an opening 114 in the hood 102, and is engaged by the oppositely acting spring pawls 115 so that the stud and the pad parts carried thereby will be rotated on each swing of the inking device to bring a fresh portion of the pad to the open slot 116 in the cover 117 of the pad. This cover is hinged at 118 to the arms 105 carrying the inking device P and is normally closed and held so by the spring 119. The pad is inked through an opening 120 in the cover carried by the pivoted lid 121. The inking pad P is held up in horizontal and normal inking position against the type adjacent thereto by the coiled spring 122 surrounding the shaft 104, the spring being bent centrally to form a tongue 123 which is fastened to the bayonet slot 124 in the hood 102. The ends 125 of the spring 122 are extended forward opposite to the tongue 123 and are passed through certain of the holes 126 in the arms 105 carrying the inking pad, the ends of the spring being thus secured to the arms so that the force of the spring is exerted to throw the pad upward. The shoulders 142 on the arms 105 acting on the hood 102 limit the upward movement of the pad.

It will be seen that the inking device is normally held in contact with the type on the printing disks and thus the type which is to print is inked just prior to printing. To swing the inking device into inoperative position and out of the path of the descending printing disk, I employ the following mechanism: Formed at the outer end of the shaft 104 is a crank-shaped arm 127, carrying a bearing roller 128. Secured to the side of the reciprocating plunger frame is an angular arm 129, formed with a forwardly and horizontally projecting portion 129′, a short inclined section 130 and a vertically extending member 131. When the frame of the printing mechanism and is in elevated non-printing position, as shown in Fig. 2, the roller 128 bears against the inclined section 130 of the angle arm, the roller being thrown forward and inward by the action of the spring which holds the printing pad in inking position. As the plunger frame starts to descend under power from the foot lever, the inclined section 130 of the angle iron bears against the roller forcing the same backward and outward, and the roller then rides up alongside the vertical member 131, as is shown in Fig. 4, the inking device being thus swung out of the path of movement of the descending printing mechanism. Upon the elevation of the plunger frame, the inking device resumes its normal inking position.

In order to clean the type, I provide a small brush 132, which is seated in a recess 133 formed in the hood 134, which surrounds the printing disk, said brush having a stud 135, carrying a head 136, a spring 137 surrounding the stud and normally tending to hold the brush away from the passing type on the disks. When it is desired to clean the type, the U-shaped pin 88 is pressed inward to unlock the disks so that they may rotate, the pin being held in this position by means of the pivoted U-shaped latch 88′ carried by the head 82. The brush is then pressed in against the type by pushing on the head, and the wheels are rotated by turning the flange 73 so that the type are brought into contact with the brush.

From the above description, taken in connection with the accompanying drawings, the construction and manner of employing my invention will be readily apparent. Assuming it be desired to attach a tag to the article to be laundered and to mark such tag, the printing disks having been properly set as heretofore described, the article is placed in position between the sides of a tag which is on the anvil of the machine, as is shown in Fig. 7. The foot lever is then depressed and the plunger frame carrying the printing disks is pulled downward until the sleeve 32 contacts with the top of the spring 61 on the guide post 31. The continued downward movement of the plunger frame then forces the plunger post carrying the tag clamping jaw downward clamping the tag on the article. The tag is thus flattened, presenting a good printing surface and the plunger frame with the disks continuing to move downward prints the selected mark on the tag, the inking device or pad being previously moved out of the path of the printing disks as heretofore described. When the clamping and printing of the tag takes place, the bar 12 for feeding the tags is, of course, in its retracted position behind the next tag to be fed to the anvil. As the printing disk and clamping jaw rise by the action of the counterweight 58 and spring 52, when pressure is released on the foot lever, the push bar actuated by the spring 18 moves forward feeding another tag to the anvil. When one tag pocket or chamber of the reservoir is empty, the latter is rotated to bring another pocket filled with the tags into feeding position.

By reference to Figs. 2, 4 and 7, it will be seen that connected to the lid of the reservoir are a number of vertically depending guides or retaining strips 138, one for each tag pocket or chamber 9, said strips extending downward in front of the pockets and are fastened at their lower ends to the hoop or band 139. Upon these strips slide the tag weights 10, the construction and arrangement being such that when all the pockets are empty by merely lifting the cover, the frame formed by the lid strips and bottom hoop and carrying the weights may be removed to permit the pockets to be refilled with tags, thus avoiding the necessity of continually changing one of these weights from one pocket to another or handling the weights separately when refilling the tag pockets.

It will be seen that I have provided a simple, economical and effective form of machine by means of which the laundry may be simultaneously tagged and marked or may be marked without tagging, as desired. Furthermore, by employing but four characters to make up the mark, I am enabled to employ relatively small tags, or to print the mark in a comparatively small space upon the goods, so that the latter will not be disfigured in any manner. In the present instance, I have shown and described a machine which will print eighteen hundred marks but it will, of course, be understood that by employing other printing disks bearing other series of marks, the reign or capacity of the machine may be increased or decreased, as desired. Furthermore, similar machines bearing other series of marks may be employed in large laundries where the number of marks would exceed a reasonable series for one of my machines.

By constructing and arranging the inking device, as shown, it will be noted that the type is always freshly inked, and by covering the inking pad in the manner shown and by providing for the rotation of the same in its casing, I prevent the rapid evaporation of the ink and at the same time provide for bringing a fresh portion of the pad beneath the type to ink the same with every operation of the machine.

While I have herein shown and described one particular embodiment of my invention, by way of illustration, I wish it to be understood that I do not confine myself to all the precise details of construction herein set forth, as modification and variation may be made without departing from the spirit of the invention or exceeding the scope of the claims.

I claim:—

1. In a machine of the class described, the combination with a support for the tag, of tag feeding mechanism movable to and from the support, a movable tag clamping mechanism, tag printing mechanism including a plunger frame movable in the same direction as the tag clamping mechanism, operating means common to the tag feeding mechanism and the tag printing mechanism to simultaneously impart motion to the same, and means carried by the plunger frame of the tag printing mechanism adapted to contact with the clamping mechanism to clamp the tag after the retraction of the tag feeding mechanism and immediately prior to the marking of such tag.

2. In a machine of the class described, the combination of a support for the tags, a horizontally reciprocating tag feeding plunger adapted to feed the tags to the support, vertically sliding tag clamping mechanism, tag printing mechanism moving in the same direction as the tag clamping mechanism, and means common to the clamping mechanism and printing mechanism for moving the clamping mechanism to clamp the tag and for simultaneously moving the printing mechanism to mark the tag upon retractive movement of the tag feeding plunger.

3. In a machine of the class described, the combination of a tag support, a laterally reciprocating tag feeding plunger for feeding the tags to the tag support, a reciprocating frame, a vertically reciprocating printing disk rotatably mounted on the frame above the support, a member reciprocating with the frame in the same direction as the printing disk, a clamping jaw carried by said member, and means for actuating the tag feeding plunger and for operating the reciprocating frame and member reciprocating therewith, to bring the clamping jaw into operation and the printing disk into action to clamp and print the tag upon the retraction of the tag feeding plunger.

4. In a machine of the class described, the combination with a support, of a reservoir located adjacent thereto, a laterally movable plunger for feeding a U-shaped tag to the article to be tagged, tag clamping mechanism for clamping the tag upon the article, printing mechanism independent of the clamping mechanism for marking the tag as it is clamped and means under control of the operator for actuating the plunger, the tag clamping mechanism and the printing mechanism.

5. In a machine of the class described, the combination of a tag support, mechanism for feeding the tag to the support, means for retracting the tag feeding mechanism, tag clamping mechanism and printing mechanism for marking the tag both mounted to vertically reciprocate above the support, said printing mechanism including a plurality of rotatably mounted type carrying disks and a vertically reciprocating supporting frame therefor, and means for operating both the clamping and printing mechanism upon the retraction of the tag feeding mechanism to clamp and print the tag.

6. In a machine of the class described, the combination of a laterally movable tag feeding mechanism including a plunger, means normally operating to cause the feeding of the tag by the plunger of the tag feeding mechanism, means for retracting the tag feeding mechanism in its lateral path, tag printing mechanism comprising a plurality of rotatable type carrying disks, a vertically sliding member upon which said disks are mounted, tag clamping mechanism, and means for actuating the tag clamping and printing mechanism to clamp and mark the tag upon the retraction of the tag feeding plunger.

7. In a machine of the class described, the combination of a laterally movable tag feeding plunger, tag clamping mechanism including a reciprocating clamping member having an opening therein, a reciprocating printing mechanism comprising a plurality of rotatable vertically disposed disks provided with type adapted to project through the opening in the clamping member and print upon the tag, and means common to the tag feeding plunger clamping mechanism and the printing mechanism for actuating these parts to feed and clamp the tag and mark the same.

8. In a machine of the class described, the combination with a support for the tag, of a reservoir located adjacent thereto, of a tag feeding plunger adapted to take the tags from the reservoir and supply the same to the support, tag clamping mechanism reciprocating above the same, tag printing mechanism also moving above the support, and means for throwing and holding the tag feeding mechanism out of operation for a predetermined period whereby the clamping and printing mechanism may be actuated while the tag feeding mechanism is held in stationary inoperative position.

9. The combination with an anvil, of tag feeding mechanism, means normally tending to actuate the tag feeding mechanism to supply tags to the anvil, a reciprocating tag clamping member, printing mechanism movable in the same direction as the tag clamping member and operating simultaneously with the tag clamping mechanism, said printing mechanism having a sliding sleeve adapted to force the clamping member into clamping position, and means for actuating the printing mechanism, said means simultaneously imparting a sliding retractive movement to the tag clamping mechanism to remove the same from the path of the clamping and printing mechanisms.

10. In a machine of the class described, the combination of an anvil or support for the tag, tag feeding mechanism for feeding the tag to the support, a vertically reciprocating clamping jaw acting in conjunction with the anvil to clamp the tag, said jaw having an opening extending therethrough, a vertically sliding member, printing mechanism comprising a plurality of vertically disposed rotatable disks mounted on said sliding member and adapted to move bodily with the same, simultaneously in the same direction with the clamping jaw and provided with type adapted to project through the opening in the clamping jaw to mark the tag.

11. In a machine of the class described, the combination of tag feeding mechanism, an anvil or tag support adapted to receive a tag supplied by the feeding mechanism, a reciprocating plunger, a clamping jaw carried by the reciprocating plunger and adapted to clamp the tag in conjunction with the anvil, a reciprocating frame sliding on the first-mentioned plunger and movable therewith, and printing mechanism carried by the plunger frame for marking the tags.

12. In a machine of the class described, the combination with tag feeding mechanism, an anvil or support for the tag adjacent to the feeding mechanism, a reciprocating plunger, a tag clamping jaw carried by the plunger and adapted to clamp the tag in conjunction with the anvil, a reciprocating plunger frame movable with the first-mentioned plunger, a rotatable printing disk carried by said plunger frame and having type thereon, and mechanism for simultaneously moving the clamping jaw and printing disk into operation, and retracting the feeding mechanism from the path of the printing mechanism and clamping jaw.

13. In a machine of the class described, the combination with an anvil or tag support, of a reciprocating feeding device for supplying a tag to the anvil, means normally moving said device forward to supply the tag, a tag clamping device, a tag printing mechanism, and means under control of the operator for actuating the clamping and printing mechanism to clamp and print the tag, and connections between the printing mechanism and the feeding mechanism for moving the feeding mechanism out of the path of the tag clamp and tag printing mechanism.

14. In a machine of the class described, the combination of a tag support, a tag reservoir located adjacent thereto, a laterally reciprocating plunger for feeding the tags to the tag support, a reciprocating tag clamping mechanism, a printing mechanism including a plurality of vertically disposed rotatable disks reciprocating with the tag clamping mechanism, said disks having type formed on the periphery thereof, and means for holding said disks against rotation during the reciprocation of the same with the tag clamping mechanism.

15. In a machine of the class described, the combination of a tag support, a tag reservoir mounted adjacent thereto, a reciprocating tag feeding member arranged adjacent to the reservoir and adapted to feed a tag therefrom to the support, a reciprocating tag clamping jaw, tension means normally moving the tag feeding mechanism forward to supply a tag to the support, and means under control of the operator for moving the clamping jaw to clamp the tag and simultaneously retract the tag feeding member, said means including a lever adapted to be actuated by the operator, and connections between said lever and the tension means to force the feeding member backward against the action of such tension means.

16. In a machine of the class described, the combination with a tag support, of a movable tag clamping jaw having a shouldered face for holding the tag in printing position relative to the support, printing mechanism movable with said jaw for marking the tag, and an inking device normally held in inking position relative to the printing mechanism when the latter is in non-printing position.

17. In a machine of the class described, the combination with a tag support, of a movable tag clamping jaw having a shouldered face adapted to hold the tag in printing position relative to the support, said jaw having an opening therethrough, and printing mechanism movable with said jaw and provided with type adapted to project through the openings in the jaw when holding the tag upon the support to print said tag.

18. In a machine of the class described, the combination with a tag support, of a reciprocating plunger frame, printing mechanism carried by said plunger frame, a plunger movable with the plunger frame, a tag clamping member carried by the plunger, means connected to the plunger frame for drawing the printing mechanism and clamping member into printing and clamping position relative to the tag support, and means for moving the plunger frame and plunger carrying the printing mechanism and clamping mechanism into inoperative position.

19. In a machine of the class described, the combination of a tag containing reservoir, a reciprocating tag feeding member located adjacent thereto for feeding a tag to the tag support, a tag support, a tension device connected to the tag feeding member and normally throwing the same forward on the tag support, a reciprocating plunger frame, rotatable printing disks carried by the plunger frame and movable therewith, means for holding said printing disks against rotation during the reciprocation of the plunger frame, a movable clamping jaw movable simultaneously with the plunger frame for clamping the tag, and means connected to the plunger frame for actuating the same to bring the printing disk and clamping mechanism into operation and to simultaneously retract the tag feeding member from the path of the moving printing disk and clamping mechanism.

20. In a machine of the class described, the combination with a tag support, of a plunger, a clamping jaw carried by the plunger, a plunger frame sleeved on the first-mentioned plunger and adapted to move therealong, printing mechanism carried by the plunger frame, operating means connected to said frame for moving the latter, means carried by the frame adapted to actuate the plunger and operate the clamping jaw, and means for feeding a tag to the support.

21. In a machine of the class described, the combination with a tag support, of a reciprocating plunger post, a clamping jaw carried by said post, tension means normally holding the post in position to elevate the clamping jaw above the tag support, a frame sliding on the plunger post, printing mechanism carried by the sliding frame, operating means connected to said frame to move the latter along the post, and a member carried by the sliding frame adapted to contact with tension means on the post and force the post downward to operate the jaw against the tension means holding the post and jaw in inoperative position.

22. In a machine of the class described, the combination with a tag support, of tag clamping means including a clamping jaw and a vertical reciprocating plunger post carrying the same, a plunger frame sliding on said post and movable downward to force the post and clamping jaw downward to clamp the tag, a plurality of rotatable printing disks carried by the plunger frame, means for holding said disks in interlocking position, and means for holding the disks against rotation during the movement of the plunger frame.

23. In a machine of the class described, the combination with an anvil, of a plunger for feeding the tag thereto, means for clamping the tag including a jaw having an opening therein and a vertically movable member carrying said jaw, a sliding frame, a sleeve forming a part of said frame adapted in its downward movement to force said clamping means into clamping position, a rotatable printing disk carried by the frame, means for holding the disk against rotation relative to the frame, and operating means for moving the frame simultaneously with the tag clamping means to bring the disk into printing operation to mark the tag.

24. In a machine of the class described, the combination with a support, of tag clamping means movable relatively thereto, of a frame movable to and from the latter a rotatable type carrying disk on the frame, means for holding the disk against rotation relative to the frame, an inking device normally in inking position against the type on the disk, means for moving the frame to bring the type into printing position, and means for swinging the inking device out of the path of the disk in its movement with the frame.

25. In a machine of the class described, the combination of a support, of means for supplying a tag thereto, vertically movable tag clamping means for clamping the tags between the support and vertically movable frame, a plurality of type carrying disks on the frame, means for holding the disk against rotation relative to the frame, an inking device normally in inking position against the type on the disk, means for moving the frame to bring the type into printing position, and means for swinging the inking device out of the path of the disk in its movement with the frame.

26. In a machine of the class described, the combination of a reservoir, an anvil located adjacent thereto, mechanism for feeding a tag from the reservoir to the anvil, a movable frame, printing mechanism mounted on and movable with the frame, clamping mechanism also movable with the frame, and an inking device adapted to bear against the printing mechanism when the latter is out of printing position, and to move out of the path of the printing mechanism when the latter is moving into printing position.

27. In a machine of the class described, the combination with a reservoir, an anvil located adjacent thereto, a reciprocating plunger adapted to supply tags from the reservoir to the anvil, a vertically reciprocating clamping device, a vertically reciprocating frame, a plurality of rotatable printing disks carried by said last-mentioned frame, type carried by the periphery of said disks, means for locking the disks together, means for holding said disks against rotation, and means for moving the clamping device and the frame to bring said device and printing disks into working position relative to the tag on the anvil.

28. In a machine of the class described, the combination with a support, of a movable plunger post, a clamping device carried thereby, a frame sliding on the plunger post, a printing disk rotatably mounted on the frame, a second printing disk sleeved on the hub of the first-mentioned disk, means for locking the disks to rotate together, means carried by the frame for holding the disks against rotation, an inking device hinged to normally contact with and ink the disks when the latter are in non-printing position, means for moving the sliding frame and plunger post to bring the clamping device and printing disks into operation, and means carried by the sliding frame for moving the inking device out of the way of the printing disks when the latter are moving into printing position.

29. In a machine of the class described, the combination with a support, of a clamping device movable to and from the latter, printing mechanism comprising a plurality of disks, a frame upon which said disks are rotatably mounted, type carried by the disks and bearing characters to compose a mark, means for rotating the disks relative to each other, means for holding the disks against rotation upon the frame, a reflector for exposing the type indicating characters upon one of the disks, an indicator for the characters of the other disk, and means for bringing the clamping device and printing mechanism into operative position.

30. In a machine of the class described, the combination with a support, of a movable frame, printing disks rotatably mounted thereon, means for permitting the independent rotation of the disks, means for locking the disks to rotate together, means for holding the disks against rotation relative to the frame, type bearing characters to constitute marks and radially mounted upon the disks, a reflector for exposing a predetermined character upon one of the disks, a swinging inking device normally pressed against and inking the adjacent type on the disks, a cleaning device arranged adjacent to the disks, means including a foot lever and connections between the same and the frame for moving the latter in printing position, means including a counterweight for returning the frame and disks into non-printing position, and means carried by the frame for moving the inking device out of inking position during the movement of the disks into printing position.

31. In a machine of the class described, the combination with a tag reservoir, of means for holding the tags in position to be fed therefrom, a device for feeding the tags from the reservoir, an anvil for receiving the tags, a vertically reciprocating clamping jaw, a vertically sliding frame, a plurality of printing disks carried by the frame, means for adjusting the disks relative to each other, means for locking the disks, and means under control of the operator for actuating the vertically sliding frame to bring the clamping jaw and printing disks into operation.

32. In a machine of the class described the combination of a tag holding reservoir, of tag feeding mechanism movable relative thereto and adapted to feed the tags one at a time, an anvil for receiving the tags from the tag feeding mechanism, a movable post, a clamping jaw carried thereby said jaw having an opening therein, such jaw being adapted to move into engagement with and clamp the tag carried by the anvil, a sliding frame, and a movable printing device carried by the sliding frame said printing device having printing type adapted to project through the opening in the clamping jaw to print upon the tag to be marked.

33. In a machine of the class described the combination with an anvil, of tag feeding mechanism including a plunger, a vertically reciprocating post, a clamping jaw carried by said post, said jaw having an opening therein for the passage of printing type, a vertically sliding frame, and a plurality of printing disks carried by said frame and provided with printing type, pockets being formed on each side of the opening of the clamping jaw adapted to receive the printing type not used at the time of the printing operation.

34. In a machine of the class described, the combination with an anvil, of means for supplying tags thereto, a clamping jaw adapted to clamp the tag, said jaw having an opening therein, and a vertically reciprocating rotary printing device comprising two printing disks having type thereon, the type of each disk being adapted to interlock with the type of the other disk and on either side thereof in a line at right angles to the horizontal axis of said disks, in a position to print when so interlocked in a line at right angles to the axis, and means for holding the disks against rotation during the printing operation.

35. In a machine of the class described, the combination with an anvil for supporting the tag, a movable clamping jaw for clamping the tag, said jaw having an opening therein, a reciprocating printing device comprising two disks rotatably mounted upon the shaft, said disks carrying type on their periphery and being adapted to interlock with each other in such manner that the type of one disk project into pockets formed in the disks on either side of the type thereon, said disk when interlocked forming a unitary structure with the type thereof lying at right angles to its own horizontal axis and adapted to print in such line, and means for holding said disks so interlocked during their reciprocation to printing position.

36. In a machine of the class described, the combination with an anvil, of a vertically sliding clamping jaw having an opening therein, a movable frame, a plurality of independently rotatable disks carried by said frame and provided with printing type located peripherally thereof, means for locking the disks together with the type of one disk alined with the type of the other disk for printing a selected mark, said means comprising ears projecting from one disk through openings in the opposite disk, and means for actuating the movable frame to project the type so alined through the opening in the vertically sliding clamping jaw and into printing contact with the article on the anvil.

37. In a machine of the class described, the combination with an anvil, of a vertically sliding clamping jaw having an opening therein, a vertically sliding frame, a front disk and a back disk rotatably mounted upon the frame and each provided with printing type, means carried by one of the disks for interlocking with the other disk, to bring a type of one disk into alinement with a type on the other disk on either side thereof at right angles to the axes of the disk for printing a selected mark, means for holding both disks against rotation, and means for moving both the vertically sliding clamping jaw and the vertically sliding frame so that the alined type will be projected through the opening in the jaw to print the selected mark.

38. In a machine of the class described, the combination with an anvil, of a reciprocating clamping jaw mounted above the anvil and having an opening therethrough, two type-carrying disks, a frame provided with an axle upon which said disks are mounted, means for rotating the disks, means for locking the disks together, an element for locking the disks against rotation on the frame, a hood extending from the movable jaw, an inking pad receptacle hingedly supported on the hood, and carrying an inking pad, a cover for said receptacle having a slot therein exposing a portion of the inking pad, means normally pressing the exposed portion of the pad against the adjacent type of the disks when the latter are in non-printing position, and means for moving the disk carrying frame to project the type through the opening in the clamping jaw to print upon an article on the anvil.

39. In a machine of the class described, the combination with an anvil, of a plunger post sliding relative thereto, a plunger frame sliding upon the post, a spring surrounding the plunger post and located above the sliding connection of the frame therewith, a second spring upon the plunger post below said sliding connection, two type-carrying disks mounted upon the sliding frame, means for locking the disks against movement on the frame, a clamping jaw carried by the plunger post and provided with an opening, and means for actuating the sliding frame to impart movement to the latter and to the plunger post carrying the clamping jaw whereby the latter is moved into clamping position and the type on the disks projected through the opening in the jaw to print upon an article on the anvil.

40. In a machine of the class described, the combination with an anvil, of a frame movable relative to the anvil, a plurality of printing disks rotatably mounted on the frame, type mounted upon each of said disks, characters upon the face of one of the disks indicative of the type on such disk, characters upon the back of the other disk, similarly indicative of the type on such disk, a mirror for reflecting the characters on the back of the last-mentioned disk, means for setting the disks to bring selective type into printing alinement, a plunger movable with and actuated by the frame carrying the type disks, and a clamping jaw having an opening therein through which the type may be projected to print a selected mark upon an article on the anvil.

41. In a machine of the class described, the combination with an anvil or support, of a movable clamping jaw, a movable frame, a plurality of type-carrying disks mounted upon said frame, one of said disks having openings therein adapted to be brought into alinement with elongated openings spaced apart in the front disk, an angular member carried by the frame and having a portion adapted to project through the openings in the disk to lock the same against rotation on the movement of the frame, the end of said portion of the member striking between the elongated openings and against the back of the disk when the disks are not properly alined thereby holding the said member in rearwardly extended position so that it strikes against the support for the clamping jaw and prevents the downward movement of the frame.

42. In a machine of the class described, the combination with a tag reservoir, of an anvil located adjacent thereto and adapted to receive tags from the reservoir, tag feeding mechanism, tag clamping mechanism, means for holding the tags in position against backward movement on the anvil as they are fed thereto, a vertically reciprocating sliding frame, a plurality of printing disks carried by the frame, means for adjusting the disks relative to each other, means for locking the disks, and means under the control of the operator for actuating the vertically sliding frame to bring the clamping mechanism and printing disks into operation.

43. In a machine of the class described, the combination with an anvil, of means for supplying tags thereto, a movable plunger post, a clamping device carried by said post, a frame sliding on the plunger post, a printing mechanism comprising a plurality of printing disks adapted to slide and rotate upon said frame, type carried by the disks and bearing characters to compose a mark, the type of one disk being adapted to interlock with the type of an adjacent disk in a line at right angles to the horizontal axes of the disks and in a position to print when so interlocked at right angles to the said axes, and tension means for holding the disks so interlocked during the printing operation.

44. In a machine of the class described, the combination with an anvil, of means for supplying tags thereto, a movable plunger post, a clamping device carried by said post, a frame sliding on the plunger post, a printing mechanism comprising a plurality of printing disks adapted to slide and rotate upon said frame, type carried by the disks and bearing characters to compose a mark, the type of one disk being adapted to interlock with the type of an adjacent disk in a line at right angles to the horizontal axes of the disks and in a position to print when so interlocked at right angles to the said axes, and means for holding the disks so interlocked during the printing operation.

In testimony whereof I affix my signature in presence of two witnesses.

CLAUDE R. DODGE.

Witnesses:
RICHARD B. CAVANAGH,
BENNETT S. JONES.